United States Patent [19]

Hazenbroek et al.

[11] Patent Number: 4,788,749
[45] Date of Patent: Dec. 6, 1988

[54] CROP REMOVAL SYSTEM

[76] Inventors: Jacobus E. Hazenbroek; Bastiaan Verrijp, both of Burg de Zeeuwstraat 52, Numansdorp, Netherlands

[21] Appl. No.: 74,557
[22] Filed: Jul. 17, 1987
[51] Int. Cl.$^4$ ............................................. A22C 21/06
[52] U.S. Cl. .................................................. 17/11
[58] Field of Search ............................................. 17/11

[56] References Cited

U.S. PATENT DOCUMENTS

| | | |
|---|---|---|
| D. 140,193 | 1/1945 | Lynn ................................ D11/1 |
| 959,604 | 5/1910 | Qua . |
| 1,080,929 | 12/1913 | Romeo . |
| 1,371,948 | 3/1921 | Szütz . |
| 1,421,397 | 7/1922 | Bruck . |
| 1,785,531 | 12/1930 | Roesch et al. . |
| 2,108,921 | 2/1938 | McKim ................................ 17/1 |
| 2,508,957 | 5/1950 | Lynn ................................ 17/11 |
| 2,512,290 | 6/1950 | Spang ................................ 17/11 |
| 2,533,445 | 12/1950 | Finney ................................ 17/11 |
| 2,547,608 | 4/1951 | Toti et al. . |
| 2,753,632 | 7/1956 | Varn ................................ 30/355 |
| 2,795,815 | 6/1957 | Dahlberg ................................ 17/11 |
| 3,618,208 | 11/1971 | Cronheim ................................ 30/34 |
| 3,958,303 | 5/1976 | Scheier et al. ................... 17/11.1 R |
| 4,023,237 | 5/1977 | Meyn ................................ 17/11 |
| 4,131,973 | 1/1979 | Verbakel ................................ 17/52 |
| 4,155,146 | 5/1979 | Meyn ................................ 17/11 |
| 4,208,764 | 6/1980 | Loth et al. ................................ 17/45 |
| 4,467,498 | 8/1984 | Graham et al. ................................ 17/45 |
| 4,610,050 | 9/1986 | Tieleman et al. ................................ 17/11 |

OTHER PUBLICATIONS

Photocopy of fruit coring implement–antique.
Systemate Euijeerator MK IV, 2 pp.
Systemate Bird Washer, 2 pp.
Systemate Lung Extractor, 2 pp.

Primary Examiner—Willie G. Abercrombie
Attorney, Agent, or Firm—Thomas & Kennedy

[57] ABSTRACT

As turret 12 rotates on vertical axle 20, probe assemblies 14 are raised and lowered by cam track 29. Drive belt 76 engages the drive sheave 42 of the probes as the probes pass around the back of the machine, causing the probes to rotate about their longitudinal axes 46. Ring cam 48 urges cam sheaves 58 radially outwardly into engagement with the belt 76 to disengage the belt from the probe drive sheaves 42, so that the probes 34 rotate only during part of their revolution about the turret 12. Probe head 35 includes a stem 88 of parallelopiped cross section, with helical teeth 90 and 91 which extend at a radius from the acute angle into overlying relationship with respect to the obtuse angle of the stem.

5 Claims, 2 Drawing Sheets

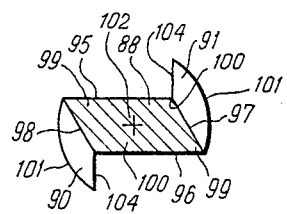 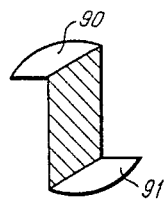 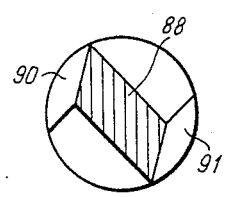
FIG. 4    FIG. 6    FIG. 8
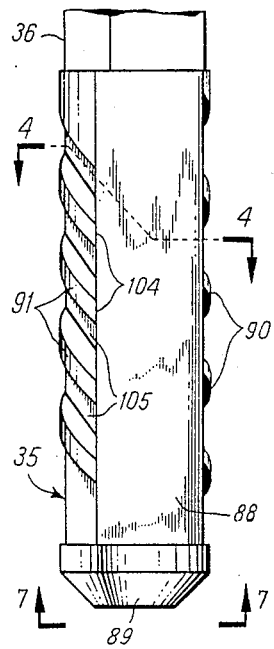 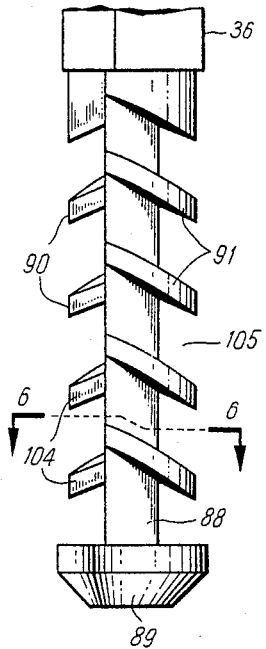 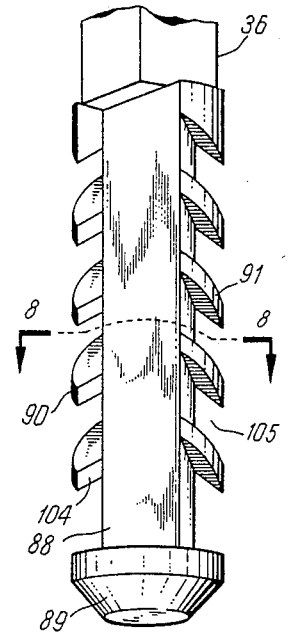
FIG. 3    FIG. 5    FIG. 7
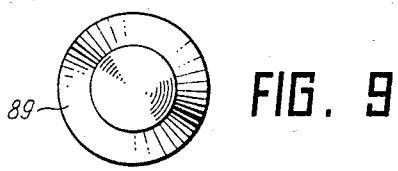
FIG. 9

CROP REMOVAL SYSTEM

FIELD OF THE INVENTION

The invention relates to a system for removing the crop, gullet and viscera from poultry carcasses that have been previously slaughtered and at least partially eviscerated as the poultry carcasses are suspended by their legs and moved in series along an overhead conveyor. More particularly, this invention relates to a crop removal system whereby a probe is moved downwardly into the previously eviscerated and decapitated bird, on through the neck opening of the bird, with the probe being rotated as it moves so as to gather and pull the crop, gullet and associated viscera with the probe out of the neck opening of the bird.

BACKGROUND OF THE INVENTION

After a poultry carcass has been decapitated and eviscerated by opening the vent of the bird and removing the heart, liver, intestines, lungs and other viscera from the bird, it is necessary to remove the crop and gullet and possibly some remaining viscera from the bird. This can be done by hand, but in recent years automated equipment has been developed for removing the crop, etc. from birds.

The automated equipment in common use at the present time which is used for the removal of the crops of birds comprises a rotary machine placed in the overhead conveyor line of a poultry processing plant. The conveyor line rotates an outer turret of the machine about an inner stationary support frame, and as the birds are moved in an arcuate path about the turret, probes mounted at the circumference of the turret revolve with the turret and move downwardly into the previously opened vents of the birds, and downwardly through the neck opening of the birds and pull the crops and other viscera with them as they move out of the neck openings. The probes usually are rotated during its downward movement, and the heads of the probes include teeth or other protrusions that tend to gather the crop, etc. during the rotational movement.

After the crop has been pulled as described above, the probes are then retracted in an upward direction so that the probe heads are withdrawn back through the bird before the bird moves with the conveyor line away from the machine. U.S. Pat. No. 4,610,050 discloses a crop removal machine of this general type.

During the operation of a crop removal machine, it is desirable to cause each probe that removes the crop from the bird to reciprocate along its length in upward and downward directions, and also to rotate as it reciprocates, so that each probe can move downwardly through the body of the bird and rotate during its downward movement so as to gather and then expel the crop, etc. from the bird. This is accomplished as the probe is revolving about the peripheral portion of the rotary turret mounted on the support frame of the machine.

While the prior art poultry crop removal machines generally have included gears and other components that accomplish the reciprocating and rotary motions of the probes moving with the rotary turret of the machine, the prior art machines comprise rather complex gear assemblies and related driving components for each probe and the machines are somewhat expensive to construct and to assemble.

SUMMARY OF THE INVENTION

Briefly described, the present invention comprises a poultry crop removal system which includes a rotary turret mounted on a stationary support frame and driven about a vertical axis by the poultry processing line. Probe assemblies are mounted at spaced intervals about the rotary turret and revolve with the turret as the turret rotates. Each probe assembly includes a cam follower that follows a cam track mounted to the support frame, so that the probe assembly reciprocates along its length in response to the rotary movement of the turret. A drive belt extends entirely about the turret and engages the probe assemblies of the turret and is driven by a motor so as to impart rotation to each probe assembly during its circular movement with the rotary turret. The belt is moved radially out of engagement with the probe assemblies during part of the rotation of the turret so as to terminate the rotary motion of the probe assemblies during part of the travel of the probe assemblies about the turret. This simple arrangement permits each probe to rotate only when desired, as during the critical span of movement through the bird, after the probe has first entered the visceral cavity of the bird and then begins its further downward movement through and beyond the neck opening of the bird.

Each probe includes a probe head of special design that is adapted to engage the crop, gullet and related viscera as the probe rotates and moves through the visceral cavity and neck opening of the bird.

Thus, it is an object of this invention to provide an improved crop removal system for automatically removing the crop and related visceral elements from birds as a series of birds are moved along a poultry processing line, whereby a simplified arrangement of rotating the probes of the system is provided.

Another object of this invention is to provide a durable and inexpensive poultry crop removal system which functions reliably to remove the crop and related viscera from birds as the birds move in series through an automated poultry processing system, whereby an external driving belt surrounds a rotary turret of the system and rotates the crop removal probes carried by the turret during certain segments of their movement with the rotary turret.

Another object of this invention is to provide an improved probe head which is effective to engage and gather the crop and related viscera of a bird as the probe head moves downwardly through the visceral cavity and through the neck opening of a decapitated, partially eviscerated bird.

Other objects, features and advantages of this invention will become apparent upon reading the following specification, when taken in conjunction with the accompanying drawings.

BRIEF DESCRIPTION OF THE DRAWINGS

FIG. 3 is a side view of the probe head.

FIG. 4 is a top cross sectional view of the probe head, taken along lines 4—4 of FIG. 3.

FIG. 5 is a side view of the probe head, with the probe head rotated 90° about its longitudinal axis with respect to FIG. 3.

FIG. 6 is a top cross sectional view of the probe head, taken along lines 6—6 of FIG. 5.

FIG. 7 is a perspective illustration of the probe head, with the probe head rotated about its axis 45° between the positions of FIGS. 3 and 5.

FIG. 8 is a top cross sectional view of the probe head, taken along lines 8—8 of FIG. 7.

FIG. 9 is a bottom view of the probe head.

DETAILED DESCRIPTION

Figure 1:
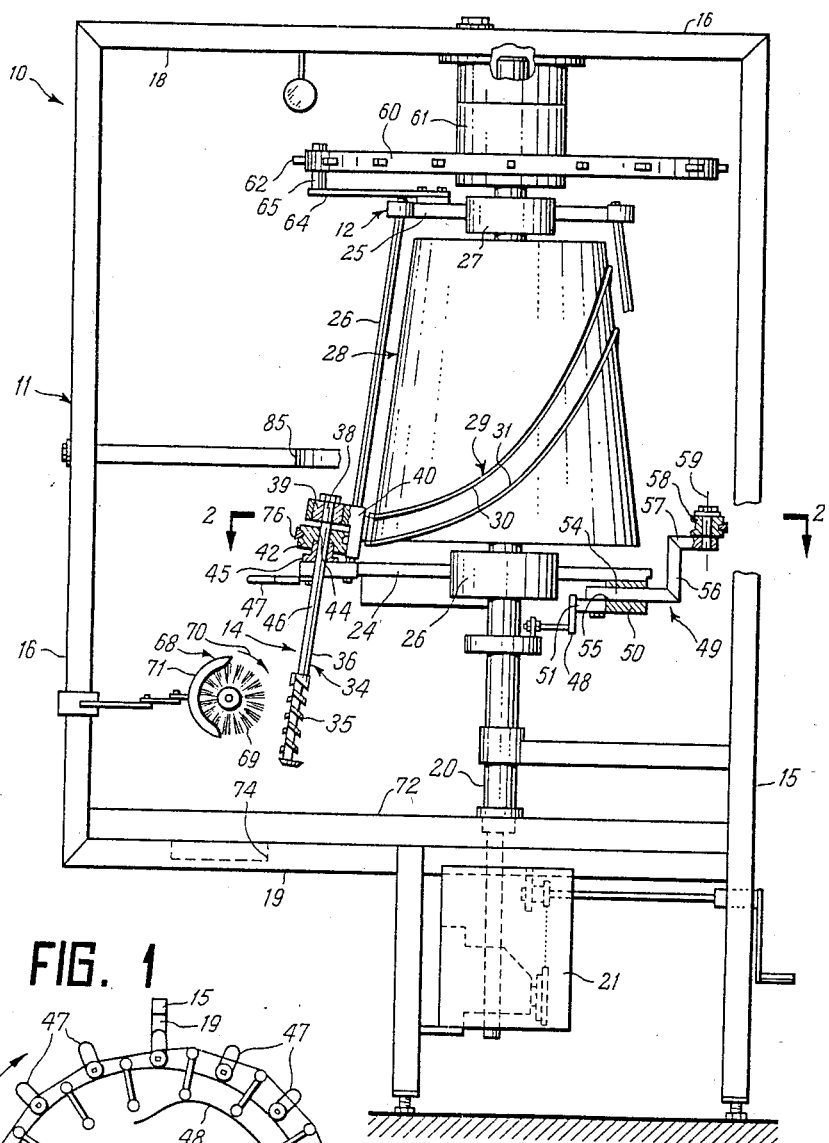
FIG. 1 is a side elevational view, partially in cross section, of the crop removal machine, showing one probe assembly on one side of the machine and showing one cam sheave assembly on the other side of the machine.

Referring now in more detail to the drawings, in which like numerals indicate like parts throughout the several views, FIG. 1 illustrates a crop removal machine 10 which generally includes a support frame 11, a rotary turret 12 mounted on the support frame and a plurality of probe assemblies 14 mounted to the turret.

Support frame 11 comprises vertical support legs 15, 16 and 17 and horizontal support legs 18 and 19. The support legs are arranged in a structural configuration that is compatible to the poultry processing line and tends to support the other elements of the crop removal machine 10. Vertical axle 20 is mounted in the support frame, and jack 21 is suspended from the support frame support leg 19 beneath the vertical axle so as to raise and lower the vertical axle and is arranged to align the machine with the poultry processing conveyor line.

Turret 12 comprises lower and upper rotary disks 24 and 25 which are mounted on bearings 26 and 27, respectively about the verical axle 20, so as to be freely rotatable with respect to the stationary vertical axle. A plurality of guide rods 26 extend between the outer peripheries of the lower and upper disks 24 and 25, with guide rods being attached at their ends to the upper disks. There are two guide rods for each probe assembly 14, and the guide rods are arranged in a circumferential array about the lower and upper disks 24 and 25. Thus, the lower and upper disks 24 and 25 and guide rods 26 form a rigid turret that is rotatable about the stationary vertical axle 20.

Cam drum 28 is positioned inside the array of guide rods 26 and is mounted in fixed relationship with respect to the stationary vertical axle 20. A cam track 29 is formed by a pair of rails 30 and 31 on the outer surface of cam drum 28 so as to move the probe assemblies up and down as the turret 12 rotates about the vertical axle 20.

Each probe assembly 14 includes an elongated, rectilinear probe 34 which includes at its distal, downwardly directed end a probe head 35 and an upwardly extending probe shaft 36. The probe shaft 36 is of noncircular configuration in cross section, preferably of sguare cross sectional shape. The upper proximal end portion 38 of the probe 34 is cylindrically shaped, and is mounted in a bushing 39. The bushing 39 is carried in a slide block 40, with the slide block being telescopically mounted to a pair of the adjacent guide rods 26 of the turret 12. Cam wheel 41 is mounted to the face of the slide block 40 that extends toward cam drum 28, with the cam wheel being positioned in the cam track 29 of cam drum 28. Thus, as turret 12 rotates about vertical axle 20, cam track 29 of cam drum 28 will raise and lower probe assembly 14.

Probe assemblies 14 each further includes a drive sheave 42 which is mounted telescopically about the probe shaft, with the noncircular central opening 44 of the drive sheave mounted telescopically about the probe shaft 36, and with the shape of the sheave opening matching the cross sectional shape of the probe shaft. The drive sheave 42 is also mounted to a bearing support 45, with the bearing support being supported on lower disk 24 of the turret. Thus, when turret 12 rotates about vertical axle 20, the probes 34 revolve in unison with the turret and will be raised and lowered as they move with the turret by cam track 29 and the rectilinear probe shafts move telescopically through their drive sheaves 42. Also, each probe 34 is free to rotate about its longitudinal axis 46.

A plurality of leg loops 47 are mounted to lower disk 24 at circumferentially spaced intervals about the turret 12, with a leg loop 47 positioned at each probe assembly 14.

A ring cam 48 is mounted in a stationary position to vertical axle 20 at a position beneath lower disk 24. A plurality of belt cam sheave assemblies 49 are mounted to the bottom surface of lower disk 24, with each belt cam sheave assembly being reciprocally mounted in a slide block 50 which is attached to the lower disk 24. Each belt cam sheave assembly 49 includes an inner roller 51 that engages ring cam 48, and an approximately Z-shaped slide bar 52 that includes a lower horizontal segment 54 that is telescopically movable through the opening 55 of the slide block 50, an upright segment 55 mounted to the outer end of the lower horizontal segment, and an upper horizontal segment 57 that extends radially outwardly from the upright segment 56. Cam sheave 58 is mounted to the upper horizontal segment 57 of slide bar 52 and is rotatable about its central axis 59. With this arrangement, the cam sheave 58 of each belt cam sheave assembly 49 will reciprocate radially in response to revolving with the turret 12 and engaging the noncircular ring cam 48.

As illustrated in the upper portion of FIG. 1, drive sprocket 60 is mounted to stationary vertical axle 20 by means for bearing assembly 61, and the outer, radially extending teeth 62 of the drive sprocket are engaged and are driven by the chain of the overhead conveyor system (not shown). Drive shaft 64 is rigidly mounted to the upper disk 25 of turret 12, and the upwardly extending protrusion 65 of the drive shaft engages with drive sprocket 60 so as to transmit the rotary motion of the drive sprocket 60 to the turret 12.

Rotary brush assembly 68 is mounted to support frame 11 and is motor driven (not shown). The rotary brush assembly 68 includes a cylindrically shaped brush 69 mounted so as to rotate in the direction indicated by arrow 70 in the vicinity of the probe heads 35 as the probe heads move with the turret 12 adjacent the brush. A shield 71 tends to guide the removed entrails in a downward direction after having been removed from the probe heads 35. A catch pan 72 is supported by support frame 11 beneath the path of travel of the probe assemblies 14, and a drain opening 74 is formed in the bottom of the catch pan for removal of the crops, viscera, etc.

Figure 2:
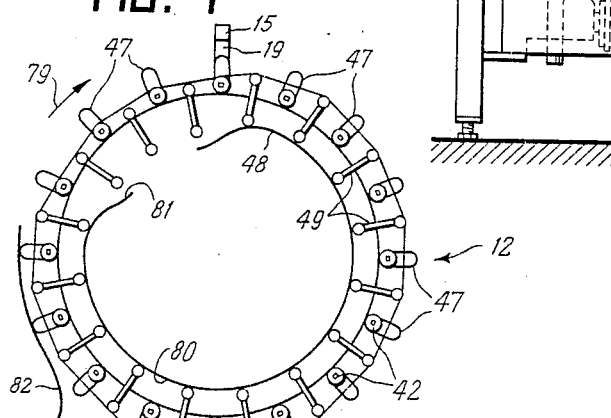
FIG. 2 is a top, schematic illustration of the crop removal machine, illustrating the manner in which the drive belt engages the probe assemblies and the manner in which the cam sheave assemblies cause the drive belt to engage and disengage the probe assemblies as the turret of the machine rotates.

As illustrated in FIG. 2, a drive belt 76 surrounds turret 12 and the drive sheaves 42 of the probe assemblies 14 and cam sheaves 58 of the belt cam sheave assembly 49. Electric motor and sheave assembly 78 are mounted to the support frame and are arranged to drive belt 76, with the motor and sheave 78 being positioned between the entrance and exit of the conveyor line to and from the machine. The drive belt 76 is wrapped entirely about the turret 12 at the level of the drive sheaves 42 and cam sheaves 58, and the belt 76 will rotate those sheaves that it contacts. It will be noted that the sheaves 42 and 58 positioned closely adjacent the motor and sheave assembly 78 are not in contact with the belt until they revolve with the turret beyond the position of the motor and sheave 78. Further, when the belt cam sheaves 49 are moving about the wider radius cord 80 of the ring cam 48, the belt cam sheave assemblies 49 will be distended so as to urge the cam sheave 58 of each belt cam sheave assembly radially outwardly so that the cam sheave 58 engages the drive belt 76 and moves the drive belt 76 radially outwardly away from engagement with drive sheaves 42 of the probe assemblies 14. However, as the belt cam sheaves 49 move about the smaller radius cord 81 of the ring cam 48, the belt cam sheave assemblies 49 are permitted to retract radially inwardly under the force applied by the drive belt 76, so that the drive belt 76 directly contacts and rotates the drive sheaves 42 of the probe assemblies 14.

With this arrangement, the drive belt will function to rotate the probes 34 about their longitudinal axes 46 as the probes move about the smaller radius cord 81 of the ring cam 48, but when the probes move beyond the smaller radius cord 81 and engage the larger radius cord 80, the drive belt will be lifted by the cam sheaves 58 radially away from the drive sheaves 42 of the probe assemblies, so that the probe assemblies will not be rotated by the belt about their longitudinal axes 46.

The smaller radius arc 81 of the ring cam 48 is located in the first one-half of the arcuate movement of the conveyor line about the crop removal machine 10, in that portion of the machine where the probes 34 have entered the partially eviscerated cavity of the bird and move downwardly through the visceral cavity and through and beyond the neck opening of the bird. Thus, the probes 34 will begin rotating after they enter the cavity of the bird and as they move through the cavity and through the neck opening and beyond the neck opening and protrude out of the lower end of the bird. The centrifugal force applied to the crop, etc. gathered to the probe head tends to remove the crop, etc. from the probe head. Rotary brush 68 is located at the entrance of the machine so as to engage the probe heads 35 when the probe heads are out of the birds and moving toward the oncoming line of birds, so as to tend to remove the crop, etc. from the probe heads.

Guide rods 82 guide the shackles and the birds moving on the conveyor line in the direction as indicated by arrow 84 into the entrance portion of the crop removal machine, so that the legs of the birds (not shown) straddle the leg loops 47 and present the back of the bird in facing relationship with respect to the turret 12. A shackle guide 85 is supported by support frame 11 and encircles the turret 12. Thus, the birds and the shackles are guided into proper position at each probe assembly 14, with the legs of the birds being in straddled relationship with respect to the leg loops 47.

As illustrated in FIGS. 3–9, the probe head 35 which is mounted at the distal end to the probe shaft 36 comprises a centrally located stem 88, a beveled distal end portion 89, and teeth 90 and 91 which extend from opposed surfaces of the stem 88.

As illustrated in FIGS. 4, 6 and 8, the stem 88 is parallelepiped in cross section, in that it includes parallel opposed surfaces 95, 96 and 97, 98, and opposed acute and obtuse angles 99 and 100. The teeth 90 and 91 have arcuate outer surfaces 101 which extend at a radius from the longitudinal axis 102 of the stem, with the base of each tooth beginning at the apex of an acute angle 99 and extending circumferentially from the apex of the acute angle to an overlying relationship with respect to the apex of the obtuse angle 100. The flat faces 104 of the teeth 90 and 91 are parallel to one another, are normal to the opposed side surfaces 95 and 96 of the stem 88, and face in opposite directions.

As illustrated in FIGS. 3, 5 and 7, the teeth 90 and 91 are shaped so as to protrude in a downward, helical shape toward the distal, beveled end portion 89 of the probe head. Open ended slots 105 are formed between the teeth. The teeth are illustrated in Figs. 3, 5 and 7 as being left handed, in that the probe head 35 would be rotated in a counterclockwise direction and the flat surfaces 104 of the teeth would lead in the direction of rotation. However, it should be understood that the teeth of the probe heads can be formed in the opposite helical direction so as to form a "right handed" probe head, if desired.

The effect of the rather large slots 105 defined between adjacent ones of the teeth 91 of probe head is that a substantial amount of space is available for the accumulation of the crop, gullet and other parts of the bird as the probe head is rotated in the rather narrow confines of the neck passage. The parts of the bird tend to become engaged by the leading flat surfaces of the teeth, with the teeth tending to gather the parts, and with the unengaged portions of the parts tending to become gathered within the spaces 105 between the teeth. After the probe head has passed completely through the neck opening and protrudes downwardly below the bird, the centrifugal force applied to the tissue removed from the bird will tend to remove the tissue from the probe head.

It should be understood that the just described embodiment merely illustrates principles of the invention in one preferred form. Many modifications, additions and deletions may, of course, be made thereto without departure from the spirit and scope of the invention as set forth in the following claims.

We claim:

1. Apparatus for removing the lungs, crop and other viscera from partially eviscerated birds suspended by their legs from an overhead conveyor and moving in series through a poultry processing path, said apparatus including a support frame, a turret rotatable about said support frame in response to the movement of said conveyor, a plurality of rotatable probe assemblies mounted about said turret and movable with said turret, cam means mounted on said support frame for raising and lowering said probe assemblies in response to the rotation of said turret, the improvement therein comprising each of said probe assemblies including an elongated probe and a driving sheave mounted to said probe for rotating the probe about its longitudinal axis, a driving belt surrounding said turret at the level of said driving sheaves and arranged to engage and rotate said driving sheaves and probes, and means for engaging said driving belt and interrupting the rotating engagement between said driving belt and said probes so as to interrupt the rotation of the probes about their longitudinal axis.

2. Apparatus for removing the lungs, crop and other viscera from partially eviscerated birds suspended by their legs from an overhead conveyor and moving in series through a poultry processing path, said apparatus including a support frame, a turret rotatable about said support frame in response to the movement of said conveyor, a plurality of rotatable probe assemblies mounted about said support frame for raising and lowering said probe assemblies in response to the rotation of said turret, the improvement therein comprising each of said probe assemblies including an elongated probe and a driving sheave mounted to said probe for rotating the probe about its longitudinal axis, a driving belt surrounding said turret at the level said driving sheaves and arranged to engage and rotate said driving sheaves and probes, an additional set of cam sheave assemblies movably mounted about and movable with said turret with a cam sheave positioned between adjacent driving sheaves, and cam means mounted to said support frame and arranged to move said cam sheaves into and out of engagement with said driving belt in response to the rotation of said turret about said support frame to move said driving belt out of and toward driving engagement with said driving sheaves whereby the rotation of the probes is controlled.

3. The apparatus of claim 1 and wherein each of said probe assemblies comprises an elongated probe with a probe head (35) at its lower end and a probe shaft (36) extending upwardly from said probe head, said probe head being of unitary construction and having a proximal end mounted to and aligned with said probe shaft and a beveled distal end (89), a rectilinear stem (88) of parallelepiped cross section with opposed surfaces (95, 96 and 97, 98) intersecting one another at opposed acute angles (99) and opposed obtuse angles (100), and a plurality of teeth (90,91) mounted to opposite sides of the stem and spaced along the length of the probe head and each of said teeth extending from the acute angle in an arc about the longitudinal axis of said stem and overlying the adjacent obtuse angle.

4. The apparatus of claim 1 and further including a motor including a sheave for driving said driving belt, said driving belt surrounding said turret, said driving sheaves and said motor sheave.

5. Apparatus for removing the crop and other viscera from partially eviscerated birds suspended by their legs from an overhead conveyor and moving in series through a poultry processing path, said apparatus including a support frame, a turret rotatable about said support frame in response to the movement of the conveyor, a plurality of rotatable probe assemblies mounted about said turret and movable with said turret, cam means mounted on said support frame for raising and lowering said probe assemblies in response to the rotation of said turret for inserting the probe assemblies into the partially eviscerated cavity of a bird, the improvement therein comprising each of said probe assemblies including a downwardly directed elongated probe comprising a probe head at its lower end and a probe shaft at its upper end, a probe drive belt surrounding said turret and arranged in driving relationship with said probe assemblies to rotate said probes as said probes revolve in a circular path with said turret and as the probes are moved in a downward direction and cam means for disengaging said probe drive belt from driving relationship with said probe assemblies, whereby the rotary movement imparted to the probes by the probe drive belt is interrupted by the cam means as the probes revolve with the turret.

* * * * *